United States Patent [19]

Larsen et al.

[11] Patent Number: 4,978,477
[45] Date of Patent: Dec. 18, 1990

[54] PROCESS FOR TREATMENT OF HAZARDOUS WASTES BY REVERSE BURN GASIFICATION

[75] Inventors: David W. Larsen, St. Louis; Stanley E. Manahan, Columbia, both of Mo.

[73] Assignee: Chem Char Research, Inc., Columbia, Mo.

[21] Appl. No.: 502,327

[22] Filed: Mar. 30, 1990

[51] Int. Cl.$^5$ .............................................. G21F 9/00
[52] U.S. Cl. ................................... 252/626; 252/630; 252/632; 110/237; 44/589; 44/591
[58] Field of Search ....................... 252/626, 630, 632; 110/237; 44/589, 591

[56] References Cited

U.S. PATENT DOCUMENTS

| | | | |
|---|---|---|---|
| 4,052,173 | 10/1977 | Schulz | 48/202 |
| 4,152,119 | 5/1979 | Schulz | 44/1 D |
| 4,225,457 | 9/1980 | Schulz | 252/373 |
| 4,315,656 | 2/1982 | Hall | 299/1 |
| 4,352,332 | 10/1982 | Baston | 110/346 |
| 4,499,833 | 2/1985 | Grantham | 110/342 |

OTHER PUBLICATIONS

Disinger et al., "Some Unique Approaches to the Chromatographic and Spectrophotometric Analysis of Underground Coal Gasification By-Product Waters and Their Applications to Environmental Control", 8th Underground Coal Conversion Symposium, Aug. 1982, pp. 345-354.

Manahan et al., "Interaction of Contaminated Water and Solid Material By-Products from in situ Coal Gasification: Implications for Pollution Control Technology", 6th Underground Coal Conversion Symposium, 1980, 10 pages.

"Hanna Coal Used to Destroy PCBs", The Laramie Daily Boomerang, Oct. 15, 1988.

Gale, "The Adsorption of Trace Heavy Metals From Solution by Coal and Coal Derived Solid Phases", May 1981.

Kistler et al., "Behavior of Chromium, Nickel, Cooper, Zinc, Cadmium, Mercury, and Lead During the Pyrolysis of Sewage Sludge", Environ. Sci. Technol. 1987, 21, pp. 704-708.

Oppelt, "Hazardous Waste Destruction", Environ. Sci. Technol., vol. 20, No. 4, 1986, pp. 312-318.

Primary Examiner—Peter A. Nelson
Assistant Examiner—Chrisman D. Carroll
Attorney, Agent, or Firm—Senniger, Powers, Leavitt & Roedel

[57] ABSTRACT

Process for the treatment of a hazardous material containing a thermochemically destructible component comprising contacting the material with a carbon char, thereafter loading the carbon char into a reaction vessel having two ends, initiating a flame front at one end of the loaded vessel, introducing an oxidant to the other end of the vessel, and allowing the flame front to move through the carbon char in the direction of the end through which the oxidant is introduced and away from the end at which the flame front was initiated.

34 Claims, No Drawings

PROCESS FOR TREATMENT OF HAZARDOUS WASTES BY REVERSE BURN GASIFICATION

FIELD OF THE INVENTION

The present invention relates, in general, to a process for the treatment of materials classified as hazardous wastes which contain a thermochemically destructible component.

BACKGROUND OF THE INVENTION

Materials containing non-naturally occurring levels of certain organic or inorganic components rendering the material potentially harmful to human health or the environment have been defined as hazardous by the United States Environmental Protection Agency and must be treated and/or disposed of in an appropriate manner.

Incineration is a preferred method for the destruction of hazardous organic substances. However, wastes classified as hazardous often contain mixtures of several substances including hazardous inorganic components such as heavy metals. If wastes containing both an organic component and a heavy metal component are incinerated, a fraction of the metal(s) present will be vaporized and exit the incineration zone along with the flue gas, thus creating a new pollution control problem. Consequently, incineration of wastes containing both an organic component and a metal component requires either the removal of the metals prior to incineration, or removal of the metals from the flue gas prior to its discharge to the environment. Significant disadvantages are associated with either approach.

Innovative thermal processes to destroy hazardous organic wastes have been proposed. See, e.g., H. Freeman, "Innovative Thermal Hazardous Waste Treatment Processes," (Noyes Publications, Park Ridge, N.J., 1985) where such thermal processes were organized in generic categories: wet oxidation, chemical transformation, molten glass, fluidized bed incineration, pyrolysis, molten salt, advanted incinerators, electric reactors, and plasma systems. Given that there is a broad range of hazardous materials to be treated and that physically and chemically effective, economical, emission free treatment must be done under a variety of conditions (sometimes on-site), a range of methods is needed. None of these approaches in itself is sufficient for the treatment of all hazardous materials, and taken in aggregate, existing technology is not sufficient.

As an alternative to thermal processes, hazardous materials containing a mixture of organic(s) and heavy metal(s) (or other hazardous inorganic components) can be set in Portland cement. While this approach is superior to typical thermal processes with respect to the immobilization of the inorganic component, it is inferior to thermal processes with respect to the organic component. Unlike thermal processes, such immobilization methods may not result in a destruction of the organic components which in many instances may be classified as hazardous. Furthermore, the loading must be kept small in order to obtain quality product.

Consequently, a need has remained for a process for the treatment of hazardous materials containing a thermochemically destructible component.

SUMMARY OF THE PRESENT INVENTION

Among the several objects of the invention, therefore, may be noted the provision of a process for the treatment of hazardous materials which contain a thermochemically destructible component such as an organic compound or certain inorganic salts, the provision of such a process in which the thermochemically destructible component is thermally and/or chemically destroyed, the provision of such a process in which any hazardous inorganic component is substantially immobilized, the provision of such a process in which the volume of waste is reduced, and the provision of such a process which compares favorably on a cost basis with conventionally used processes.

Briefly, therefore, the present invention is directed to a process for the treatment of a hazardous material containing a thermochemically destructible component. The process comprises contacting the material with a carbon char and packing the carbon char into a reaction vessel having two ends. A flame front is initiated at one end of the vessel and an oxidant is introduced at the other end of the vessel. The flame front is allowed to move through the packed vessel toward the end through which the oxidant is introduced. As the flame front moves through the packed vessel, the thermochemically destructible component is thermally and/or chemically destroyed and hazardous inorganic components present in the material are substantially retained by the carbon char.

The present invention is also directed to a process for the regeneration of an activated carbon or coke product which contains a thermochemically destructible component. The activated product is packed into a reaction vessel having two ends. A flame front is initiated at one end of the vessel and an oxidant is introduced at the other end of the vessel. The flame front is allowed to move through the packed activated product toward the end at which the oxidant is introduced. As the flame front moves through the packed vessel, the thermochemically destructible component is thermally and/or chemically destroyed.

Other objects and features of this invention will be in part apparent and in part pointed out hereinafter.

DESCRIPTION OF A PREFERRED EMBODIMENT

Reverse burn gasification of coal is a well known process and is typically carried out by packing the coal into a cylindrical reaction vessel, initiating a flame front at one end of the vessel and introducing an oxidant at the other end of the vessel so that the flame front moves toward the oxidant inlet. A combustible gas mixture is produced and is discharged through an outlet located adjacent the end at which the flame front is initiated. Between the oxidant inlet and the flame front, the atmosphere is oxidizing. Between the flame front and the gas outlet, the atmosphere is reducing. The propagation of the flame front is dependent upon such variables as the oxidant flow rate, its relative humidity and pressure.

As used herein, the term thermochemically destructible component shall mean those compositions which are chemically destroyed in the presence of chemically active species, e.g., nascent hydrogen, or under thermal extremes, e.g., temperatures in excess of about 900° C.

As used herein, the term carbon char shall mean carbon essentially free of organic matter determined as volatile material. The carbon may be obtained from a carbonaceous material such as subbituminous coals (e.g., peat, lignite or brown coal), bituminous coals including the highly volatile and caking coals, anthracite coals, petroleum cokes and wood. The carbonaceous material may be treated in any manner known in the art to increase the carbon content, such methods including pyrolysis and reverse burn gasification of the carbonaceous material.

For use in accordance with the present invention, it is preferred that the carbon char be an activated carbon or coke. The term activated carbon is commonly used to describe activated carbon products having a surface area of at least about 300 square meters per gram. The term activated coke is commonly used to describe activated carbon products having a surface area less than about 300 square meters per gram. Activated coke is particularly preferred because of its lesser cost relative to activated carbons.

Although it is preferred that the carbon char be activated prior to admixture with the hazardous waste material, the method of activation is not critical. The carbon char may be activated by steam distillation according to standard technique or it may be activated by reverse burn gasification.

To provide activated carbon char by reverse burn gasification, a suitable carbonaceous substance such as a non-swelling subbituminous coal or other carbonizable material may be used. In batch mode operation, the granular material is placed into a cylindrical reaction vessel and oxidant (preferably oxygen or compressed air) is passed through the container. The oxidant may be saturated with water vapor or steam may be injected directly into the reaction vessel. A reverse-burn combustion is initiated at the end of the cylinder opposite the oxidant inlet. A flame front (narrow combustion zone) develops and moves along the cylinder against the oxidant flow. Temperatures in the range of 900° C. to 1800° C. (depending on oxidant flow rate) develop during the process. The composition of the evolving gas depends on the operating parameters (pressures and rates of flow of oxidant and water, and temperature), but the primary combustible components are hydrogen and carbon monoxide.

The reverse burn of the carbonaceous material is preferably completed three times for subbituminous coal and twice for petroleum coke to produce a granular, activated carbon char product. The product is essentially pure carbon with a very high caloric content. Ash content will depend on the starting carbonaceous material. The yield is typically 40% based on native coal and 75% based on petroleum coke. Approximately 10 to 20 percent of the carbon char is consumed in each cycle of the reverse burn gasification process.

When produced by reverse burn gasification, the activated char particles retain the approximate size and shape of the granular coal particles used for their preparation. The char is relatively hard and non-crushable. By use of a conventional acetic acid method, the surface area of a carbon char produced from Wyoming coal was found to be about 200 to 250 square meters per gram, which is comparable to that of a low surface area commercial activated carbon. In contrast to commercial activated carbons, activated carbon chars produced by reverse burn gasification are very porous and contain large void spaces which gives the char about half the effective density of a typical commercial activated carbon. Electron microscopy reveals the presence of large pores in the coal char, i.e., in the range of about 10-100 microns whereas pore sizes in a typical commercial activated carbon are in the sub-micron range. The char is very adsorbent and mixes easily with sludges and other problem mixtures.

Surprisingly, it has been discovered that when a granular carbon char and a hazardous material which contains a thermochemically destructible component are admixed and subjected to reverse burn gasification, the thermochemically destructible components of the material are substantially thermally and/or chemically destroyed. It has further been discovered that hazardous inorganic components of the material (with the exception of mercury) are substantially immobilized and retained on the carbon char during the reverse burn gasification.

Virtually all toxic inorganic constituents remain on the char during the reverse burn gasification and no fly ash is produced. Accordingly, the waste material to be treated may include almost any non-explosive inorganic constituent including but not limited to heavy metals, heavy metal salts, organometallic compounds, precursors to acid gases, precursors to ammonia, precursors to hydrogen cyanide. The reverse burn gasification reactivates the char surface so that sorption processes help to fix the inorganics and other sorbable species.

The thermochemically destructible component may be an organic or inorganic composition, or may include both. Exemplary organic thermochemically destructible components include polychlorinated biphenyls, dioxins, or hexachlorobenzene. Exemplary inorganic thermochemically destructible components include organometallic compounds, precursors to acid gases, precursors to ammonia, and precursors to hydrogen cyanide.

In general, the process of the present invention may be used for the treatment of such materials as soil, sludge, sand, rock, tailings and polymeric materials which contain a hazardous component. However, it has particular utility in the treatment of hazardous materials which contain an organic component (which may be hazardous) and a hazardous inorganic component. For example, the process is particularly well adapted for the treatment of soil and sludges containing halogenated organics such as polychlorinated biphenyls, oils, grease and heavy metals. In addition, this process is also particularly well adapted for the treatment of organic resins containing low levels of radionuclei and organic contaminants from nuclear reactor cooling water.

Prior to contact with the carbon char, the hazardous material may range from a free flowing liquid to a solid (such as resin) or heavy sludge. In each instance, the hazardous material is contacted with the carbon char to form a carbon char/hazardous material mixture or to sorb the hazardous components from the material onto the char.

For hazardous free-flowing liquids, the liquid and char are preferably contacted under conditions effective for the sorption of the hazardous material by the char; the carbon char has a natural tendency to sorb a wide variety of components, both organic and inorganic. Typically, such sorption may be achieved by passing the liquid through a bed of the char.

For hazardous sludges, the sludge and the char are contacted to form a carbon char/hazardous waste mixture. If desired, water or organic waste solvent may be used to assist in the mixing depending upon the nature of the sludge. Upon settling, phase separation tends to occur and the excess solvent can be drawn off. Centrifugation may be required in some cases. For an aqueous based sludge, dewatering tends to occur due to capillary action of the char leaving the sludge components dispersed as a dry mixture on the char surface. The loading of the char will vary depending upon the material to be treated. Typically, the char can be loaded at between 10 to 400 percent of the char weight.

The optimum proportions of char and hazardous material to be admixed must be determined experimentally for each material and may vary widely. For instance, where the hazardous waste is soil it is preferred that the ratio of soil to char be approximately 4 to 1, respectively on a weight basis. For certain PCB containing sludges, it is preferred that the ratio of sludge to char be approximately 1 to 19, respectively on a weight basis. For the treatment of spent resins containing radioactive nuclei, they are preferably handled as a slurry (e.g., 50% dry resin to 50% water) which is mixed with the char in the ratio of about 20 parts of slurry to about 3 parts of char, by weight.

After admixture with the hazardous material, the carbon char is subjected to reverse burn gasification to destroy the thermochemically destructible components. The oxidant is preferably oxygen or air, but other oxidants such as nitrous oxides may be used under controlled conditions. The combustion occurs on the surface of the carbon matrix in the immediate vicinity of the hazardous components. Reactive chemical species are formed at high temperature which subject the organic compounds to a hot reaction zone. For instance, in the case of chlorine-containing compounds such as PCBs, the reaction conditions result in destruction of the C-Cl bonds to form HCl. The nature of and extent to which reactive chemical species are present in the reaction zone may be controlled to some extent by the introduction of desired compounds, such as water vapor (either as steam or saturated oxidant) in the oxidant stream. Alkaline compounds can be added to neutralize acid gas products.

Depending upon the reverse burn conditions and the nature of the hazardous components with which the activated char was admixed, a plurality of reverse burn cycles may be necessary to substantially destroy the thermochemically destructible components. For instance, where the char has been admixed with materials containing as much as 10% PCBs, unreacted PCBs have been found on the activated char at levels less than 0.05% of the original PCB level after two reverse-burn gasification cycles with no detectable PCB emissions in the flue gas. However, any number of burns can be performed that are required to reach the desired residual levels; usually two burns are sufficient.

In general, the carbon char preferably has a size of between about 20 mesh and about 60 mesh. However, the desired size for any particular treatment process is subject to several considerations. First, a homogenous char/hazardous material mixture is desired, and the hazardous material particle size, viscosity, and surface tension all affect homogeneity. Second, a uniform flame front is desired, and reducing char particle size generally results in a more uniform flame front. Third, good heat transfer is desired, and reducing particle size generally improves heat transfer. Fourth, unimpeded oxidant flow is desired, and reducing particle size (especially for very fine particles) increases impedence to oxidant flow. There are a number of conflicting factors, so that a compromise is necessary. In some applications, it may be desireable to use a mixture of granular char along with some very fine char (carbon black).

Oxygen at one atmosphere is preferably used as the oxidant for the reverse burn because the apparatus is relatively less complex and because the flame front is more well behaved. Pressures other than one atmosphere may be used, but the apparatus and process control become more complex. The oxygen may have a relative humidity between about 0 and 100 percent and fluxes between about 0.16 and about 1.8 L/minute/-square centimeter. The oxygen requirement is between about 0.4 and about 0.7 pounds of oxygen per pound of char. The rate of flame front movement is typically between about 1 and about 30 minutes per lineal foot in the reaction vessel for the first reverse burn gasification of char/waste mixtures, and between 10 and 60 seconds per lineal foot for subsequent reverse burn gasifications of char/waste mitures. Temperatures attained in the flame front vary between about 900° C. and 1800° C. depending on (a) the oxygen flux and (b) the water content of the oxidant gas (a higher water content results in lower flame front temperature).

For destruction of refractory hazardous materials such as organo halides (e.g., polychlorinated biphenyls, hexachlorobenzene) it may be preferred to add a supplemental fuel source to the carbon char/hazardous material mixture. The supplemental fuel source may be admixed with the hazardous material prior to contacting the carbon char, or the carbon char may first be admixed with the hazardous material and the carbon char/hazardous material mixture is then mixed with the supplemental fuel. Liquid hydrocarbons such as diesel fuel and kerosene or other hydrogen sources may be used as supplemental fuels.

Without being bound to any theory, it is presently believed that the initial energy driving the chemical reactions comes from the combustion of carbon (an oxidation process). However, because of the carbon matrix, the chemical environment on the carbon surface is reducing. Under these circumstances, the organics are converted partly to solid carbon and partly to gaseous products, primarily carbon monoxide, carbon dioxide and water. Depending on the heteroatom content, hydrogen sulfide, nitrogen, ammonia, and hydrogen chloride may also be formed from sulfur, nitrogen, and chloride containing molecules. It is possible that small amounts of sulfur and nitrogen oxides may be formed, depending upon conditions. Acid gases (e.g., hydrogen sulfide and hydrogen chloride) tend to be strongly held on the char.

In carrying out the process of the present invention, the gasification conditions must be controlled in order to prevent a runaway reaction or explosion. Thus, strong oxidants such as ammonium perchlorate or other highly reactive species such as hydrides should be limited or excluded. Alternatively, the waste can be pretreated to remove such compositions.

The process of the present invention may be carried out in any reaction vessel which has the requisite structural integrity and is appropriately shaped to allow for the propagation of a flame front which will travel countercurrent to the flow of oxidant. The vessel is preferably cylindrical. Establishing and maintaining the flame front in as wide a reactor as feasible (to minimize process time) is an important consideration in reactor scale-up. During operation, it is not necessary to view the flame front; temperature sensors may be used. The reaction vessel is preferably maintained at atmospheric pressure (to simplify apparatus) or at slight subatmospheric pressures in order to minimize the release of gases except through the reactor vessel outlet.

The need for treatment of the flue gas produced by the gasification depends upon the composition of the material being subjected to reverse burn gasification. As noted above, substantially all of the organic contaminants will be destroyed during the burn and toxic inorganic contaminants will be substantially retained by the char. Nevertheless, for any particular application it may be preferred that gas exiting the gasification vessel be passed through a condensing unit in which small amounts of vapors (other than fixed gases) not held on the column will be removed. The condensate should be treated with activated char and/or resins and released. The combustible gas should be treated either by standard means (e.g., scrubbers) or filtered through a char filter unit, which may be treated with appropriate additives to remove specific acidic or basic product gases not captured in the condensate. The gases may be polished by membrane filtration and flared. The final treatment is expected to be small in scale because most of the hazardous materials have either been destroyed or remain on the activated char.

After the thermochemically destructible components have been destroyed, the char can be treated in one of several ways. Provided the inorganic loading is sufficiently small, the char can be recycled for admixture with additional hazardous material. Alternatively, the char may be used as an aggregate for concrete, mixed with slag forming compositions and reduced to a slag by forward burn gasification, or it may be vitrified by subjecting the char to a forward burn in the presence of the requisite amounts of soda, lime and waste glass.

Significantly, the entire process is energy self-sufficient since activated char serves as the fuel. A large amount of heat is evolved during the gasification process and a combustible gas product is formed which may include some hazardous organic components.

As noted above, activated carbons that have been used to sorb thermochemically destructible components (which may or may not be hazardous) may be regenerated by reverse burn gasification in accordance with the present invention. Regeneration in this manner affords significant advantages over conventional approaches in many instances.

The following examples illustrate the invention.

EXAMPLE 1

(Preparation of Activated Carbon Char)

Coal Samples

Two samples of subbituminous coals from Wyoming were used in the studies. One was from the Rosebud Mine in Hannah and the other is a sample of unknown origin (referred to as Wyoming II) obtained from Prof. Robert Gunn, Department of Chemical Engineering, University of Wyoming. The Rosebud coal had a low ash content and 12,000 BTU/lb. Moisture content in the Rosebud coal was 10-20%, and the moisture content in the Wyoming II coal was estimated to be 15%.

Coal Preparation

Coal samples, stored under water prior to use, were reduced to a granular form (a heterogenous distribution of particle sizes ranging from a fine powder to 5 mm) by use of a simple homebuilt crusher. The fine granules (which constituted only a few percent of the total) were separated from the remainder with a 20 mesh screen for test purposes. In most commercial applications, this separation is not necessary. In most cases, samples (designated U) received no other treatment prior to gasification. Samples designated D were dried by heating at 250° C. for 1 hour prior to gasification, and samples designated P were reduced to a coke by pyrolysis at 550° C. for 1 hour prior to gasification. Samples designated F were the fine granules (smaller than 20 mesh).

Gasification Reactor

The reactor used in the studies was designed to operate with pure oxygen gas at atmospheric pressure; the exit port was open to the atmosphere. The reactor had the following features:
1. The body of the reactor was Vycor tubing 19 mm in diameter by about 10 inches long, which could hold about 35 g of coal.
2. Aluminum end caps held by support rods were made to mate with the Vycor tubing and were sealed to it by use of O Rings.
3. An inlet was mounted in the top cap for oxygen gas.
4. A 1.5 inch length of Nichrome heater wire was mounted in the bottom cap through a ceramic sheath. Gasification was initiated by applying a voltage across the wire.
5. The product gases, coal tar, and water were emitted through an outlet in the bottom of the reactor.

Oxidant

The oxidant used was oxygen gas obtained from a cylinder with a pressure reducing valve. The flow rate was determined by use of a rotameter, and the reactions were timed so that the total weight of oxygen used could be determined. In preliminary experiments, moisture content of the oxygen gas was varied by passing the dry gas through a fritted glass bubbler containing water held at a specific temperature. It was found that while water content affects the gasification parameters, the process can be run with oxidant gases containing a wide range of moisture contents. Since the coal samples contained at least 10% moisture, dry oxidant gas was used to prepare the char.

Oxygen Demand

This parameter was determined as the ratio of the weight of oxygen consumed per weight of coal to produce a triple reverse-burn char.

Triple Reverse-Burn Gasification

The oxidant gas was passed through the column of coal (from top to bottom) and gasification was initiated with the heater wire at the bottom of the reactor. After a few seconds, a stable, self propagating flame front developed and moved slowly up the tube. The flame front is based on a series of complex chemical reactions of the type:

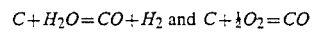
$$C + H_2O = CO + H_2 \text{ and } C + \tfrac{1}{2}O_2 = CO$$

The gaseous products, coal tar and water emerged from the bottom of the tube during the process. Coal tar and water were caught in a simple trap, and the emerging combustible gas was burned off. When the flame front reached the top of the tube, the gas flow was stopped and the column was allowed to cool before the process was repeated. Three reverse-burns were used in each case to prepare the char.

Process Time

Depending on oxidant flow rate, the first reverse-burn gasification takes between 1 and 30 minutes per linear foot. Subsequent reverse-burn gasifications take between 10 and 60 seconds per linear foot.

Process Temperature

The maximum temperature in the process is attained in the flame front. The temperature directly follows the oxidant gas flow rate as evidenced by the brightness and color of the flame front. Visual inspection indicates that the temperature is at least 1200° C. Attempts to measure the temperature with an optical pyrometer were unsuccessful. Various wire, including Nichrome heater wire, were placed in the reactor bed prior to gasification. These wires fused at high oxidant flow rates, which indicates that temperatures above 1700° C. were attained.

Percent Yield

This parameter was determined as the weight of char product divided by the initial weight of coal sample, multiplied by 100.

Apparent Density

The apparent density is the weight of the char sample divided by the volume occupied by the granular sample contained in a graduated cylinder, expressed as g/ml. The apparent densities of Rosebud and Wyoming II coals are 0.61 and 0.64 g/ml, respectively. The true densities of the coals are greater than 1 g/ml.

| Sample Wt (g) | Flow Rate (L/min) | Oxygen used (g) 1st | 2nd | 3rd | Oxygen Demand | Char Yield | Apparent Density |
|---|---|---|---|---|---|---|---|
| Results for Rosebud Coal: | | | | | | | |
| 34 U | 0.45 | 15.6 | 4.9 | 4.0 | .70 | 45% | 0.37 |
| 34 U | 2.0 | 15.4 | 3.0 | 3.0 | .63 | 41% | 0.33 |
| 30 D | 2.0 | 6.4 | 2.5 | 2.4 | .37 | 43% | 0.34 |
| 40 U | 2.0 | 17.1 | 2.4 | 2.4 | .55 | 40% | ** |
| 40 P | 2.0 | 5.8 | 4.1 | N/A | .25 | 50% | 0.60 |
| 34 U | 3.0 | 18.5 | 2.8 | 2.9 | .71 | 39% | 0.28 |
| 34 U | 4.0 | 9.5 | 2.1 | 3.1 | .43 | 40% | 0.30 |
| 34 U | 4.0 | 8.6 | 1.9 | 2.9 | .39 | 38% | 0.27 |
| 34 U | 4.0 | Severe Swelling | | | | | |
| 34 U,S | 5.0 | 15.2 | 2.5 | 3.6 | .63 | 33% | 0.23 |
| 25.5 D | 1.0 | 6.1 | 2.5 | 2.5 | .44 | 50% | ** |
| 50 U,F | 1.25 | 6.0 | 1.6 | 1.4 | .18 | 17% | 0.24 |
| Results from Wyoming II Coal: | | | | | | | |
| 34 U | 1.0 | 9.7 | 1.2 | 1.5 | .36 | 42% | 0.26 |
| 34 U | 2.0 | 7.2 | 0.9 | 1.4 | .28 | 48% | 0.28 |
| 34 U,F | 2.0 | 9.0 | 1.4 | 1.7 | .36 | 41% | 0.23 |
| 25 D | 2.0 | 4.8 | 1.6 | 1.9 | .33 | 41% | 0.26 |
| 34 U,S | 3.0 | 8.5 | 1.4 | 1.9 | .35 | 41% | 0.27 |

U - Undried, granular coal
D - Dried (250° C., 1 hour) granular coal
F - Finely ground coal (below 20 mesh)
S - Swelling problem
P - Sample was pyrolyzed (550° C., 1 hr) prior to gasification

EXAMPLE 2

(Treatment of a Hazardous Waste Sludge)

A sludge was obtained from the Eastern Region of the Environmental Protection Agency. The sludge contained the following constituents:

| Aroclor (PCBs) | 10% |
|---|---|
| Oil and Grease | 24% |
| Lead | 5% |
| Mercury | .5% |
| Chromium | 1% |
| Chloride | 11% |

The sludge was in the form of a semi-dry cake which holds its shape.

The sludge was admixed with activated carbon char (produced according to Example 1) by suspending it in hexane in a round bottomed flask, adding the char, and tumbling on a rotary evaporator. The composition of the mixture was:

| Sludge | 1 g |
|---|---|
| Char | 20 g |
| Hexane | 50 ml |

After tumbling for 30 minutes, the solvent was evaporated, leaving a dry product of sludge-coated char. The product (2 grams) and clean char (2 grams) were sequentially placed in a quartz tube (1 cm × 15 cm) so that relative to the oxidant flow, the clean char would be downstream from that of the coated char product. The quartz tube was fitted with ball and socket ends and connected into gasification apparatus containing two traps in series filled with hexane/10% benzene. The mixture was ignited at the interface between the coated char product and the clean char, and the coated char was gasified. The clean char was left unburned to trap any hazardous effluent. Two reverse burns were done in this fashion, and then the entire column was reverse burned to destroy any material trapped on the clean char. No vapors were visible in the process.

After cooling, the char was removed from the reactor and the reactor walls were washed down with solvent to recover any condensed material. The char residue was extracted with solvent for 1 hour. The unburned char coated with sludge was also extracted to determine the initial loading on the char.

The residues were analyzed by gas chromatography with electron capture detection. All samples were quantitated against Aroclor 1248 standards. More than 90% of the residual PCBs were retained by the char, as determined by exhaustive extraction of the char. Such exhaustive extraction was done for scientific reasons to rigorously obtain the destruction results. The usual practice is to use much milder extraction conditions or to omit the extraction altogether and assume that no undestroyed PCB's remain on the column. The remainder was found in the first trap, and essentially none was found in the second trap. The percent destruction was calculated based on the PCBs found in the various residues after gasification.

| Run Number | Percent PCB Destruction |
|---|---|
| 1 | 99.96 |
| 2 | 99.69 |
| 3 | 99.45 |
| 4 | 99.95 |

For reference, the same experiments were conducted using a commercial activated carbon (Darco Activated Carbon 20/40 Mesh). The results were:

| Run Number | Percent PCB Destruction |
|---|---|
| 1 | 96.83 |
| 2 | 94.77 |

These results apply to a single stage reactor; with a more efficient design, such as the use of a multiple stage reactor, any arbitrary destruction level (e.g. 99.9999%) should be attainable. It should be emphasized that the above method of calculation of PCB destruction differs from the conventional method used for incinerators (DRE-destruction and removal efficiency, which is: DRE=(Waste In—Emissions in Flue Gas)×100/Waste In. Based on the more standard method of calculation, 99.9999% destruction was obtained in a single stage, since PCBs were not detected in the flue gas (detection limit was at the ppb level).

EXAMPLE 3

(Treatment of Hexachlorobenzene)

Hexachlorobenzene (HCB) was admixed with activated carbon char (produced according to Example 1) at an initial loading of 1% by weight HCB. This loading was used for three reasons:
(1) HCB is a particularly difficult compound to destroy thermally.
(2) Compounds of this type are only one component in mixtures of the type for which the process of the present invention has efficacy, and this loading is appropriate to simulate that case.
(3) This loading is appropriate to simulate spent carbon that has been used to treat runoff water contaminated with chlorinated compounds.

The reactor and method used for the reverse-burn gasification were the same as in Example 2. Recovery of the unburned HCB was checked by spiking each char residue with carbon-13 labeled HCB and extracting the char with hexane/10% benzene. Recoveries of labeled HCB were above 75%.

The samples were analyzed by GC/MS with selected ion monitoring at m/e 284 and 290, the masses of unlabeled and labeled HCB molecular ions, respectively. The results are:

| Run Number | Percent PCB Destruction |
|---|---|
| 1 | 99.902 |
| 2 | 99.442 |
| 3 | 99.419 |
| 4 | 99.606 |
| 5 | 99.398 |

By products, such as lower chlorinated benzenes were not detected at the loading used in this study. Polychlorinated dibenzodioxins (PCDDs) and polychlorinated dibenzofurans (PCDFs) were found at very low concentrations (ppt levels) by Soxhlet extraction of the char with toluene.

Parallel studies done with Darco activated carbon at 1% loading gave destruction efficiencies comparable to those for the char. The results are:

| Run Number | Percent PCB Destruction |
|---|---|
| 1 | 99.900 |
| 2 | 99.810 |
| 3 | 99.815 |

About 7% of the char mass is used to destroy the HCB at 1% loading. Destruction of HCB can be accomplished at higher loadings, but the efficiency drops to about 96% at a 6% loading. These results are excellent for several reasons:
(1) The loading is reasonable for something as difficult to destroy as HCB.
(2) The char can be reused several times.
(3) Only oxygen is required for the process and no external heat source is necessary.

The combustion products in the HCB destruction process are HCl and $CO_2$. To check the mass balance in the process, the HCl was trapped by replacing the organic solvent with 0.01M NaOH solution in the two effluent traps. After passing through the traps, the effluent gas was passed directly into an ion chromatograph. The treated char was also extracted with 0.01M NaOH. The results showed that most of the chloride ion remains on the char, a small amount is found in the first trap, and essentially none is found in the second trap. The total HCl recovered as Chloride ion is given below:

| Run Number | Percent of Expected Chloride Ion |
|---|---|
| 1 | 89.9 |
| 2 | 100.3 |
| 3 | 107.6 |
| 4 | 97.1 |
| 5 | 97.1 |
| 6 | 98.7 |
| 7 | 96.9 |
| 8 | 83.9 |

EXAMPLE 4

(Regeneration of Activated Carbon Chars)

In the above-examples, it is noted that the coal char can be reused in certain applications. It is also possible that spent commercial activated carbons can be regenerated by reverse-burn gasification. Thus, both the weight loss in the carbon matrix and the change in its surface area during reverse-burn gasification were determined for coal char and two commercial activated carbons, Darco Carbon and Atochem GAC-40. The weight losses after four cycles of reverse-burn gasification were as follows:

(1) Coal char retained 70% of its initial weight.
(2) Darco Carbon retained 70% of its initial weight.
(3) Atochem GAC-40 retained 55% of its initial weight.

The surface areas results were as follows:

(1) Darco Carbon is about 600 sq m/g initially; it drops to about 200 sq m/g after one cycle, and retains this value through 5 cycles total.
(2) Atochem GAC-40 has a surface area of about 300 sq m/g initially and it retains this value through 5 cycles total.
(3) Coal char has an initial surface area of about 200 sq m/g and it retains this value through 4 cycles total.

EXAMPLE 5

The reactor and method used for the reverse-burn gasification were the same as in Example 2.

A cation exchange resin was loaded with Sr and Cs. The resin was then reverse burn gasified with char. The first run showed 100% retention of both metals in the column. A second run showed greater than 98% retention of both metals in the column. The second run had a faulty design, and it should not be difficult to get 100% retention with proper attention to detail in the design of the reactor.

EXAMPLE 6

The reactor and method used for the reverse-burn gasification were the same as in Example 2.

Radioactive Technetium-99 m was loaded onto an anion exchange resin and reverse burn gasified with char. There was no detectable radioactivity emitted from the column, which again indicates 100% retention.

EXAMPLE 7

The reactor and method used for the reverse-burn gasification were the same as in Example 2.

Sr, Cs, Ni, and Cr were loaded onto a mixed cation-/anion exchange resin and reverse burn gasified with char. The char was then forward burn gasified, which reduces it completely to ash. The effluent from the process was passed through a trap, and analysis showed no detectable levels of any metals in the trap.

In view of the above, it will be seen that the several objects of the invention are achieved and other advantageous results attained.

As various changes could be made in the above processes and products without departing from the scope of the invention, it is intended that all matter contained in the above description shall be interpreted as illustrative and not in a limiting sense.

What is claimed is:

1. A process for the treatment of a hazardous material containing a thermochemically destructible component comprising:
   (a) contacting the material with a carbon char,
   (b) thereafter loading the carbon char into a reaction vessel having two ends,
   (c) initiating a flame front at one end of the loaded vessel,
   (d) introducing an oxidant to the other end of the vessel, and
   (e) allowing the flame front to move through the carbon char in the direction of the end through which the oxidant is introduced and away from the end at which the flame front was initiated.

2. A process as set forth in claim 1 wherein steps (c) through (e) are repeated.

3. A process as set forth in claim 1 wherein a hazardous material/carbon char mixture is produced in step (a) and the mixture is loaded into the reaction vessel in step (b).

4. A process as set forth in claim 3 wherein the hazardous material is selected from the group consisting of soil, sludge, sand, rock, tailings and polymeric resins containing a hazardous inorganic material.

5. A process as set forth in claim 1 wherein the hazardous material contains a hazardous inorganic component which is substantially retained by the carbon char as the flame front moves through the reaction vessel.

6. A process as set forth in claim 5 wherein the hazardous inorganic component is a heavy metal, a heavy metal salt, an organometallic compound, a precursor to an acid gas, a precursor to ammonia, or a precursor to hydrogen cyanide.

7. A process as set forth in claim 5 wherein the thermochemically destructible component comprises a halogenated organic composition.

8. A process as set forth in claim 5 wherein the hazardous inorganic component is radioactive nuclei.

9. A process as set forth in claim 1 wherein the carbon char is activated carbon or activated coke.

10. A process as set forth in claim 1 wherein the carbon char has a pore size ranging between about 10 and about 100 microns.

11. A process as set forth in claim 1 wherein the carbon char has an average pore size in excess of about 1 micron.

12. A process as set forth in claim 1 wherein the thermochemically destructible component comprises a halogenated organic composition.

13. A process as set forth in claim 1 wherein the thermochemically destructible component comprises an organometallic compound, a precursor to an acid gas, a precursor to ammonia, or a precursor to hydrogen cyanide.

14. A process as set forth in claim 1 wherein the temperature at the flame front is between about 900° C. and 1800° C.

15. A process as set forth in claim 9 wherein the carbon char has been activated by reverse burn gasification.

16. A process as set forth in claim 1 wherein the carbon char comprises a subbituminous coal that has been activated by reverse burn gasification.

17. A process for the treatment of a hazardous material containing a thermochemically destructible component comprising:
   mixing the hazardous material with an activated carbon char, and
   subjecting the mixture to reverse burn gasification in the presence of a flow of oxidant under conditions effective to substantially thermally and/or chemically destroy the thermochemically destructible component.

18. A process as set forth in claim 17 wherein the hazardous material contains a hazardous inorganic component which is substantially immobilized on the carbon char during the reverse burn gasification step.

19. A process as set forth in claim 18 wherein the hazardous inorganic component is a non-explosive material selected from the group consisting of heavy metals, heavy metal salts, organo metalloids, precursors to acid gases, precursors to ammonia, and precursors to hydrogen cyanide.

20. A process as set forth in claim 17 wherein the carbon char has been activated by reverse burn gasification.

21. A process as set forth in claim 17 wherein the mixture is subjected to a plurality of reverse burn gasification steps.

22. A process as set forth in claim 17 wherein the oxidant is oxygen.

23. A process as set forth in claim 17 wherein the oxidant is air.

24. A process as set forth in claim 17 wherein the oxidant is at atmospheric pressure.

25. A process as set forth in claim 17 wherein the flow of oxidant is accompanied by a flow of a reactive species which will enhance the destruction of the thermochemically destructible component during the reverse burn gasification.

26. A process as set forth in claim 25 wherein the reactive species is water vapor.

27. A process as set forth in claim 25 wherein the water vapor is introduced as steam.

28. A process as set forth in claim 25 wherein the oxidant is substantially saturated with water vapor.

29. A process as set forth in claim 17 wherein the hazardous material is a sludge.

30. A process as set forth in claim 29 wherein the sludge is suspended in a solvent prior to admixture with the activated carbon char.

31. A process as set forth in claim 17 wherein the hazardous material is an ion exchange resin which is loaded with a hazardous ion.

32. A process as set forth in claim 31 wherein the ion exchange resin is loaded with radioactive nuclei.

33. A process as set forth in claim 17 wherein the treatment is in a reaction vessel that is maintained at a subatmospheric pressure.

34. A process as set forth in claim 17 wherein said mixture is further mixed with a supplemental fuel source before the resulting mixture is subjected to reverse burn gasification.

* * * * *